United States Patent
Gardner, Jr. et al.

(10) Patent No.: US 9,182,191 B2
(45) Date of Patent: Nov. 10, 2015

(54) PNEUMATIC GUN HAVING MECHANICALLY-ACTUATED PNEUMATIC VALVE

(71) Applicant: GOG Paintball, S.A., Plaza Roble Escazu (CR)

(72) Inventors: William M Gardner, Jr., Loyalhanna, PA (US); Hans Semelsberger, Loyalhanna, PA (US); Richard D Galinson, Toluca Lake, CA (US)

(73) Assignee: GOG Paintball, S.A.

( * ) Notice: Subject to any disclaimer, the term of this patent is extended or adjusted under 35 U.S.C. 154(b) by 0 days.

(21) Appl. No.: 14/046,263

(22) Filed: Oct. 4, 2013

(65) Prior Publication Data
US 2014/0096758 A1 Apr. 10, 2014

Related U.S. Application Data

(60) Provisional application No. 61/710,106, filed on Oct. 5, 2012.

(51) Int. Cl.
| | |
|---|---|
| *F41B 11/723* | (2013.01) |
| *F41B 11/72* | (2013.01) |
| *F41B 11/70* | (2013.01) |
| *F41B 11/721* | (2013.01) |

(52) U.S. Cl.
CPC ................. *F41B 11/72* (2013.01); *F41B 11/70* (2013.01); *F41B 11/721* (2013.01); *F41B 11/723* (2013.01)

(58) Field of Classification Search
CPC .......... F41B 11/72; F41B 11/62; F41B 11/73; F41B 11/721; F41B 11/68; F41B 11/722; F41B 11/724; F41B 9/0037; F41B 11/723; F41B 11/70; F41B 11/71; F41B 11/64
USPC ................................... 124/73, 71, 72, 75, 76
See application file for complete search history.

(56) References Cited

U.S. PATENT DOCUMENTS

| | | | |
|---|---|---|---|
| 5,613,483 A * | 3/1997 | Lukas et al. .................... 124/73 |
| D533,908 S | 12/2006 | Jones | |
| D535,709 S | 1/2007 | Jones | |
| D544,928 S | 6/2007 | Jones | |
| D546,297 S | 7/2007 | Jones | |
| D548,201 S | 8/2007 | Jones | |
| D554,204 S | 10/2007 | Stossell | |
| D571,415 S | 6/2008 | Jones | |

(Continued)

*Primary Examiner* — Samir Abdosh
*Assistant Examiner* — John D Cooper
(74) *Attorney, Agent, or Firm* — Craig R. Rogers; SIMPLE IP Law, P.C.

(57) ABSTRACT

According to principles of the present inventive concepts, a mechanically-actuated pneumatic valve can comprise an input port receiving compressed gas from a compressed gas regulator and one or more output ports. A face seal can be arranged in the valve body and be configured to move between two positions. In a first position, the face seal can permit compressed gas from the input port to be supplied to a first output port. In a second position, the face seal can vent compressed gas from the valve body through an exhaust port. An actuator, such as a pin or pin-shaped actuator, for example, can be configured and arranged to move the face seal from the first position to the second position, such as during a trigger pull. A contact surface could be configured to physically contact a surface of the pin-shaped actuator (either directly from the trigger or through one or more other components or mechanisms) and drive the face seal to its second position during actuation of the trigger.

20 Claims, 20 Drawing Sheets

(56) References Cited

U.S. PATENT DOCUMENTS

| | | |
|---|---|---|
| 7,461,646 B2 | 12/2008 | Jones |
| 7,556,032 B2 | 7/2009 | Jones et al. |
| 7,617,820 B2 | 11/2009 | Jones |
| 7,624,723 B2 | 12/2009 | Gardner et al. |
| 2006/0207587 A1 | 9/2006 | Jones et al. |
| 2011/0017188 A1* | 1/2011 | Call .................... 124/73 |
| 2011/0232618 A1* | 9/2011 | Gabrel ................. 124/73 |

* cited by examiner

PNEUMATIC GUN HAVING MECHANICALLY-ACTUATED PNEUMATIC VALVE

PRIORITY CLAIM

This application claims priority from U.S. Provisional Patent Application Ser. No. 61/710,106, filed Oct. 5, 2012; Chinese Patent Application Serial No. 201210589028.4, filed Dec. 31, 2012; and Taiwanese Patent Application Serial No. 102119605, filed Jun. 3, 2013; the contents of each of which are hereby incorporated herein by reference in their entirety.

BACKGROUND

1. Field of the Inventive Concepts

The present inventive concepts relate generally to pneumatic guns. More particularly, these inventive concepts relate to a pneumatic gun that provides a number of advancements over the prior art.

2. Related Art

Electronically-operated pneumatic guns have become ubiquitous in tournament and recreational paintball game play and have also found applications in other fields and industries. For instance, pneumatic guns can be used as remote delivery applicators for veterinary medicines, pesticides, insecticides, etc. In paintball particularly, electronically-operated spool-valve designs are extremely popular among players because of their relatively light weight, reliability, low-pressure operation, and ease of maintenance. One such electronically-operated paintball gun having a spool-valve design is shown and described in U.S. Pat. No. 7,617,820 ("the '820 patent"), the contents of which are hereby incorporated by reference in their entirety.

Unfortunately, however, prior to the present inventive concepts, there has not been a reliable mechanism for mechanically-operating pneumatic guns having this and other types of spool-valve designs.

SUMMARY

According to various embodiments and principles of the present inventive concepts, a mechanical pneumatic gun can provide numerous improvements over the prior art, including, for instance, a mechanically-operated trigger and valve assembly that can be used to drive a pneumatic assembly similar to that used in an electronic paintball gun.

According to one aspect of the present inventive concepts, a mechanically-operated trigger assembly for a pneumatic gun includes a trigger, a cam actuator, and a return mechanism. According to this aspect, the trigger causes the cam actuator to pivot into contact with a valve actuator for initiating a firing operation of the pneumatic gun. The trigger can interact with the cam actuator, for instance, through a geared interconnection, a geneva mechanism, or other suitable connection. The cam actuator can be configured to contact the valve actuator for a sufficient period of time (dwell) during each trigger pull to permit the valve to release a sufficient quantity of compressed gas to initiate a full firing cycle of the pneumatic gun. This can be accomplished, for instance, by configuring a contacting surface of the cam actuator with a sufficient surface area to contact the valve actuator for a sufficient length of time during each trigger pull.

The return mechanism can comprise, for instance, one or more springs or one or more magnets arranged to cause the cam mechanism to rotate sufficiently after each trigger pull to return to its ready position. For instance, the return mechanism can be a spring assembly configured to pull the cam mechanism around from the actuating position to a start position where the geared cam surface reengages with the geared trigger interconnection. Alternatively, or additionally, reverse polarity magnets can be used to apply a force that encourages the cam assembly to rotate from the firing position back to the ready position.

According to another aspect of the present inventive concepts, a mechanically-actuated pneumatic valve can comprise a valve body having an input port receiving compressed gas from a compressed gas regulator and one or more output ports. A face seal can be arranged in the valve body and be configured to move between two positions. In a first position, the face seal can permit compressed gas from the input port to be supplied to a first output port. In a second position, the face seal can vent compressed gas from the valve body through an exhaust port. An actuator, such as a pin or pin-shaped actuator, for example, can be configured and arranged to move the face seal from the first position to the second position, such as during a trigger pull. A contact surface of a trigger, for instance, could be configured to contact a surface of the pin-shaped actuator (either directly or through one or more other components or mechanisms) and drive the face seal to its second position during actuation of the trigger.

In one pneumatic gun embodiment, compressed gas having a selected pressure can be supplied from the compressed gas regulator to a compressed gas storage chamber of the pneumatic gun. The pneumatic valve can be configured to supply compressed gas of the selected pressure from the compressed gas regulator to a first surface of a spool-valve piston through the first output port when the face seal is arranged in its first, deactuated position. The compressed gas acting on the first surface of the spool-valve piston can overcome a pneumatic or spring force acting on a second surface of the spool-valve piston.

In one embodiment, the spool-valve piston can comprise a bolt and a firing valve. The first surface can be a forward surface and the pneumatic force acting on the first surface can hold the bolt in a rearward position against a pneumatic force from the compressed gas storage chamber acting on the second piston surface area.

In one embodiment, a trigger can be configured with a contact surface or actuator arranged to contact a valve actuator or valve pin of the pneumatic valve (either directly or through one or more components or mechanisms). When the trigger is pulled, its contact surface or actuator contacts the valve actuator or pin to move the face seal from its first position to its second position. In the second position, compressed gas is prevented from being supplied to the first output port from the compressed gas regulator, and gas from the first output port is instead vented through an exhaust port arranged in the valve body or elsewhere.

When the first output port communicates with the forward piston surface, gas is then vented from an area communicating with the forward piston surface and a force on the second, rearward piston surface drives the bolt forward and opens the firing valve. The bolt is thereby positioned into its forward, firing position and compressed gas from the compressed gas storage chamber vents through the firing valve and through ports arranged in the bolt to launch a projectile from the gun.

The firing valve can, for instance, comprise one or more surfaces of the bolt configured to communicate with one or more seals to retain gas in the compressed gas storage area until a firing operation is performed. During a firing operation, the bolt surface(s) and seal(s) can be configured to release the compressed gas from the compressed gas storage area through the bolt and into contact with a paintball arranged in a breech of the paintball gun.

In one embodiment, the distance the face seal travels from its first position to its second position is less than approximately 0.015 inches, and can be less than about 0.0075 inches. This short travel distance permits the valve to be actuated through a relatively short trigger pull. Using a mechanically-actuated face seal valve design thereby overcomes numerous problems encountered in the related art. Other mechanical, pneumatic designs for instance used radial seals in the actuation valve and therefore required much longer trigger pulls. Longer trigger pulls often result in misfires or misfeeds when an operator fails to fully pull or fully release the trigger during operation.

Other conventional mechanical valve designs further typically require lubrication of the moving pins, shafts or other components that control the flow of gas through the valves. A mechanical face seal design according to principles of the present inventive concepts can further eliminate lubrication requirements for the moving components of the valve and significantly reduce maintenance issues associated with the pneumatic control valve. Using this design, the life of the valve can also therefore be significantly increased.

Various aspects, embodiments, and configurations of the inventive concepts are possible without departing from the principles disclosed herein. The inventive concepts are therefore not limited to any of the particular aspects, embodiments, or configurations described herein.

BRIEF DESCRIPTION OF DRAWINGS

The foregoing and additional objects, features, and advantages of the present inventive concepts will become more readily apparent from the following detailed description of preferred embodiments, made with reference to the attached drawings, in which:

FIG. 17A illustrates a location of compressed gas and pneumatic components in the gun body during a normal, resting state, with the pneumatic gun ready to begin a firing operation;

FIG. 17B illustrates the position of the compressed gas and pneumatic components during initiation of a firing operation of the pneumatic gun;

FIG. 17C further illustrates the flow of compressed gas and positioning of pneumatic components during a firing operation of the pneumatic gun;

FIG. 17D illustrates the supply of compressed gas through the pneumatic gun when initiating a loading operation of the pneumatic gun;

FIG. 17E further illustrates the flow of compressed gas and positioning of pneumatic components during the loading operation;

DETAILED DESCRIPTION OF ILLUSTRATIVE EMBODIMENTS

Various features, benefits, and configurations incorporating principles of the present inventive concepts in illustrative embodiments are shown and described in detail in the following description and accompanying drawings. Additional features, benefits and configurations will be readily apparent to those of ordinary skill in the art based on this disclosure; and all such features, benefits and configurations are considered within the scope of the present inventive concepts.

Figure 1:
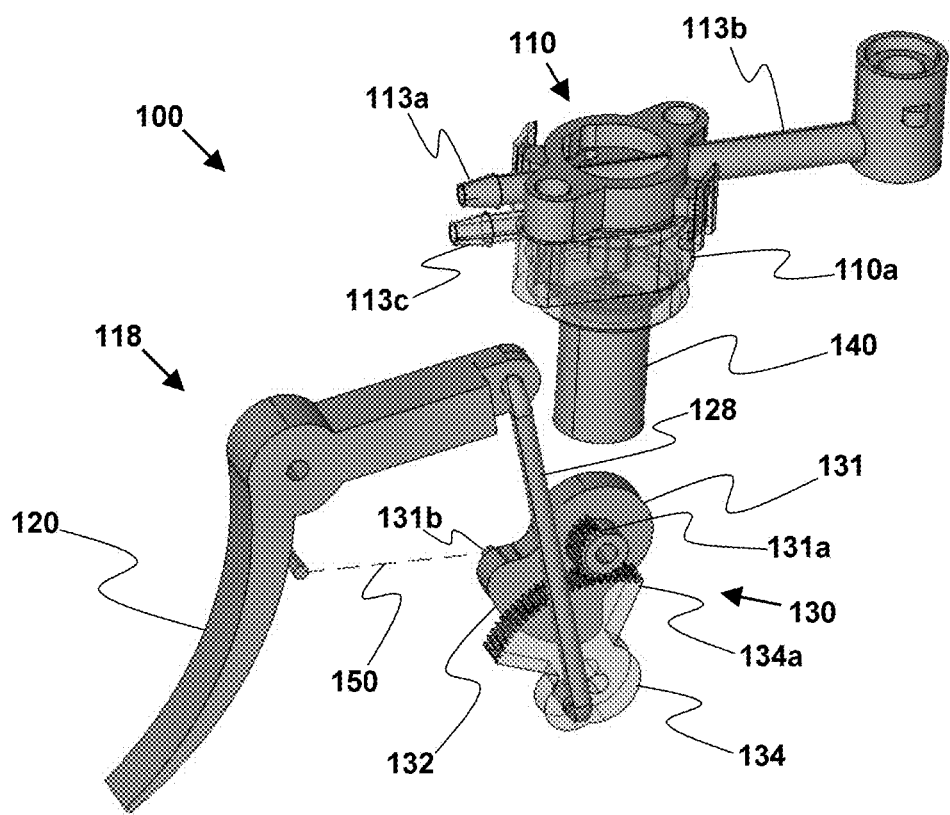
FIG. 1 is a somewhat schematic, semi-transparent perspective view showing a trigger, cam and valve assembly removed from a pneumatic gun according to one embodiment incorporating principles of the present inventive concepts.
Figure 2:
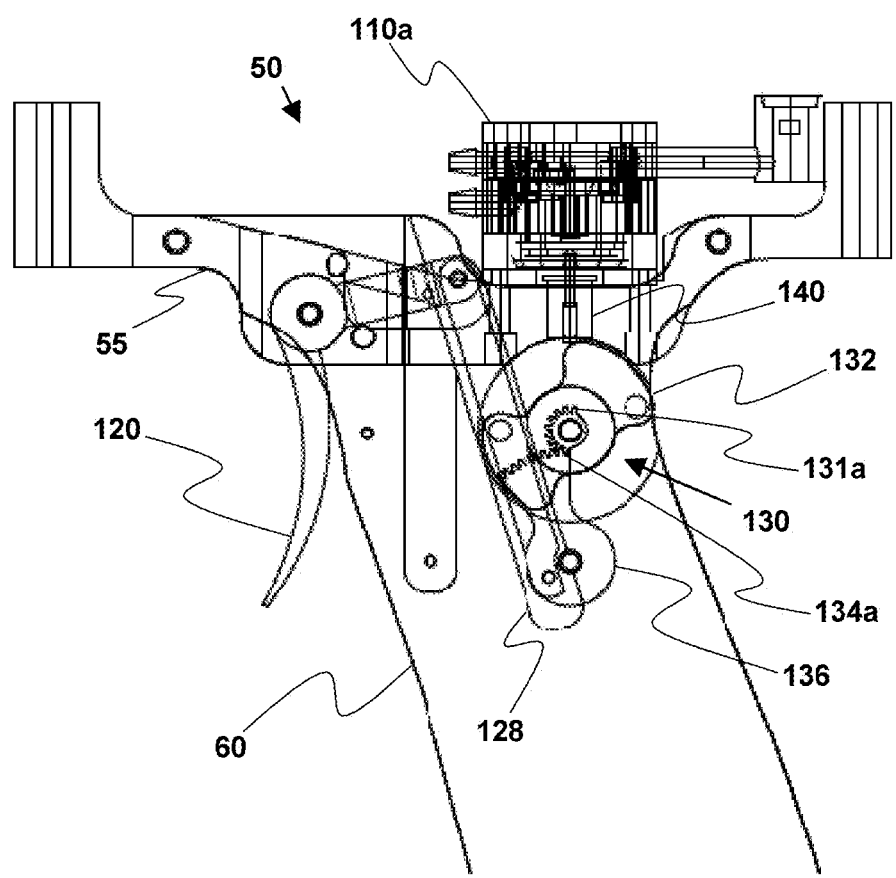
FIG. 2 is a somewhat schematic cross-sectional, semi-transparent side view of a grip frame assembly for a pneumatic gun having a trigger, cam and valve assembly according to additional principles of the present inventive concepts.

Various illustrative embodiments will now be described in connection with the accompanying drawings. Referring initially to FIG. 1, in one embodiment, parts of a trigger assembly 118 can, for instance, be made out of stamped or molded parts. A cam assembly 130, in particular, can be made from two stamped parts that are pressed together. The design shown in FIG. 1 includes two cams 131 and 134 which include two mating partial gears 131a, 134a that can, for instance, be either molded or stamped, depending on how fine a gear tooth is desired. The sizes of the two gears 131a, 134a could be increased to accommodate production limitations as long as their relative ratios stay approximately constant. Alternative designs, such as geneva mechanisms or other interconnections between the trigger and cam assemblies are also possible.

Referring specifically to FIG. 1, a mechanical trigger and valve assembly 100 is shown removed from a pneumatic gun. In FIG. 1, the mechanism 100 is shown in its resting state or ready state. In this particular design, the trigger 120 is limited to a rotation angle of about 7 degrees. As the trigger 120 rotates, it pulls the lower cam 134 and therefore partial gear 134a thru roughly a 55 degree clockwise (CW) arc via the steel connecting rod 128. The rotation of the lower gear 134a in turn rotates the upper partial gear 131a on the upper cam 131 in the counter-clockwise (CCW) direction through about 200 degrees of rotation, bringing the larger lobe (cam actuator) 132 of the cam up almost under the round piston (valve actuator) 140 of the pneumatic valve assembly 110. As the upper cam 131 is rotated, an extension spring (shown as a dotted line 150) is stretched.

When the gears disengage at about the 200 degree mark, the spring 150 is extended but the pin 131b connecting the spring 150 to the upper cam 131 is now in the over-center position. The spring 150 is therefore free to pull the upper cam 131 around the rest of the revolution, causing the contact surface of the cam actuator 132 to strike and actuate the valve actuator 140. The cam actuator 132 is preferably designed and engineered to keep the armature plate (inside valve 110) up for the correct time, thereby keeping the valve 110 open for the desired dwell time. The spring 150 preferably pulls the upper cam 131 all the way around to the starting position so the trigger 120 is ready for the next shot.

Of course, numerous variations to this specific design are possible. For instance, the size and numbers of teeth in the gears can be modified as desired to accomplish the purposes of the inventive concepts. The return force provided by the spring can be supplemented or replaced entirely by a magnetic force (e.g., provided by reverse polarity magnets appropriately situated within the assemblies). The gears may be eliminated altogether such as through use of a geneva mechanism or other design. A sear approach could be used to cock the cam against the spring tension, with the cam designed and configured not to contact with the valve piston as it is being pushed back to prevent opening the valve during the cocking portion of the trigger pull. One way to accomplish this, for example, is to offset the cam laterally during the cocking stage.

As mentioned earlier, one possible way of eliminating the gears is to use a geneva mechanism. A geneva mechanism is a gear mechanism that translates a continuous rotation into an intermittent rotary motion. The rotating drive wheel can include a pin that reaches into a slot of the driven wheel, advancing it by one step. The drive wheel also may include a raised circular blocking disc that locks the driven wheel in position between steps. In the most common arrangement, the driven wheel has four slots and thus advances for each rotation of the drive wheel by one step of 90°. If the driven wheel has n slots, it advances by 360°/n per full rotation of the drive wheel.

In a still further alternative embodiment, a small hammer and sear mechanism could be used to actuate the valve actuator. A spring-loaded hammer can be configured to strike a small mechanical valve pin or pin-shaped actuator. The mechanically-operated pneumatic valve could then be configured to operate the bolt and firing mechanisms to initiate loading and firing operations of the pneumatic gun. The valve assembly can be further configured to push the hammer back to a cocked position for the next shot.

As mentioned previously, electronically-operated pneumatic guns are commonplace in tournament and recreational paintball game play. One such electronically-operated paintball gun is shown and described in the '820 patent. The principles of the present inventive concepts provide, among other things, a mechanism for converting an electro-pneumatic paintball gun, such as that shown in the '820 patent, into a mechanically-operated pneumatic gun.

Referring now to FIGS. 2-9, according to certain embodiments of the present inventive concepts, a mechanically-operated trigger assembly 118 is provided for a pneumatic gun. The trigger assembly preferably includes a trigger 120, a cam actuator 132, and a return mechanism 150 arranged in a grip frame 60 of the pneumatic gun. The trigger 120 can be configured to cause the cam actuator 132 to pivot into contact with a valve actuator 140 for initiating firing and loading operations of the pneumatic gun.

The trigger can interact with the cam actuator 132, for instance, through a geared interconnection (as shown), a geneva mechanism (not shown), or other suitable mechanical connection. The cam actuator 132 is preferably configured to contact the valve actuator 140 for a sufficient period of time (dwell) during each trigger pull to permit the valve 110 to release a sufficient quantity of compressed gas to initiate a full firing cycle of the pneumatic gun. This can be accomplished, for instance, by configuring a contacting surface of the cam actuator 132 with a sufficient surface area to contact the valve actuator 140 for a sufficient length of time during each trigger pull. The geared connection 130 can, for instance, be configured to retain communication between the driving gear(s) 134a and the cam gear(s) 131a until after the cam actuator 132 has traveled a desired distance across the valve actuator 140, or until the cam actuator 132 disengages from contact with the valve actuator 140. The inputs and outputs of the valve 110 can, for instance, be the same as, or similar to, those of the conventional electro-pneumatic paintball gun.

The return mechanism can comprise, for instance, one or more springs 150 and/or one or more magnets (not shown) arranged to cause the cam mechanism 131 to rotate sufficiently after each trigger pull to return to its ready position. For instance, the return mechanism can be a spring assembly 150 configured to pull the cam mechanism 131 around from the actuating position to a start or ready position where the geared cam surface 131a reengages with the geared trigger interconnection 134a. Alternatively, or additionally, reverse polarity magnets (not shown) can be used to apply a force that encourages the cam assembly 131 to rotate from the firing position back to the ready position.

Figure 3:
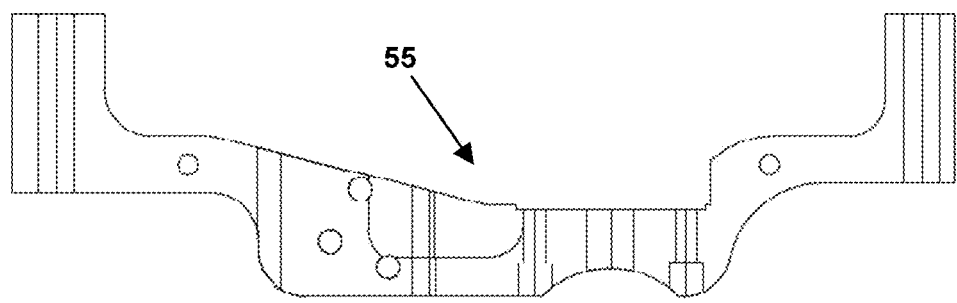
FIG. 3 is a somewhat schematic cross-sectional side view of an adapter mount for connecting the grip frame and mechanical trigger assembly of FIG. 2 to a conventional electro-pneumatic paintball gun.
Figures 4, 5:
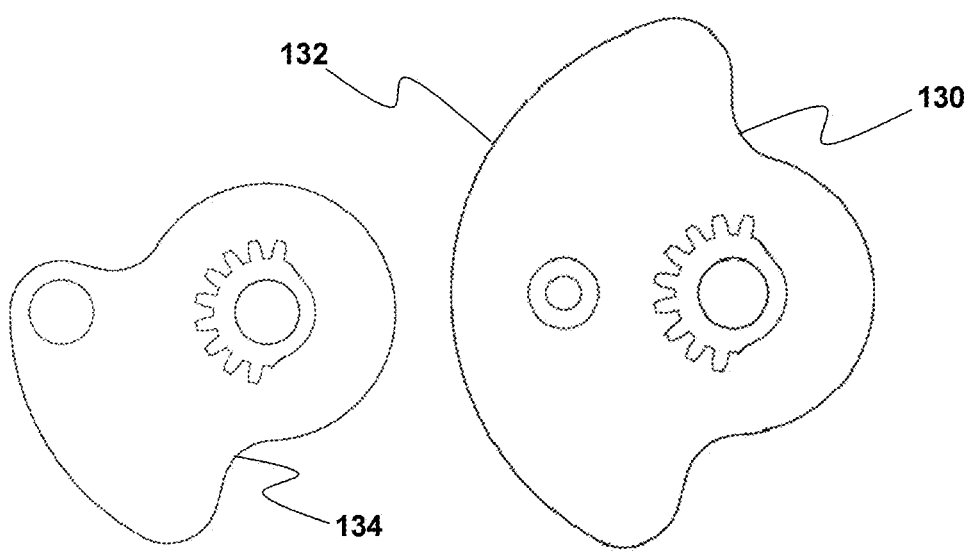
FIGS. 4 and 5 are enlarged somewhat schematic side views of a cam and large cam, respectively, from the assembly of FIG. 2.
Figure 6:
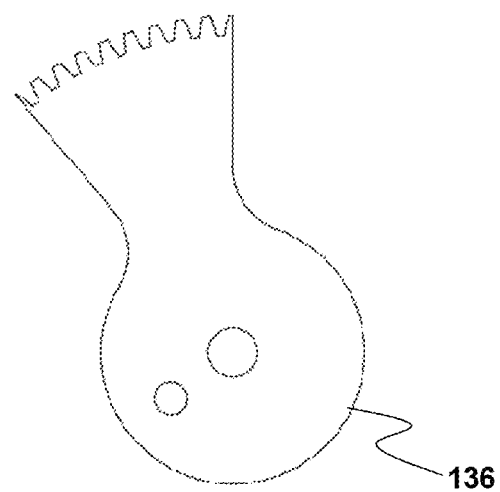
FIG. 6 is an enlarged somewhat schematic side view of the driver gear of the assembly of FIG. 2.
Figure 7:
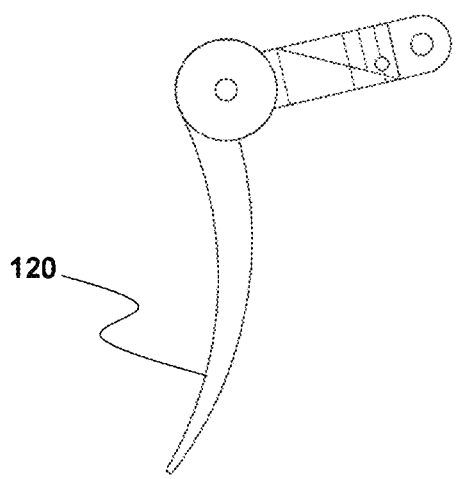
FIG. 7 is an enlarged somewhat schematic cross-sectional side view of the trigger of the assembly of FIG. 2.
Figure 8:
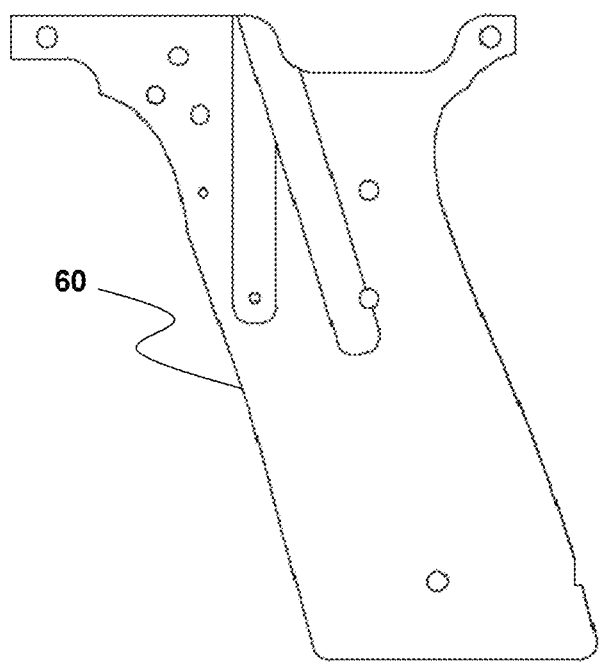
FIG. 8 is a somewhat schematic side view of the left side grip frame of the assembly of FIG. 2.
Figure 9:
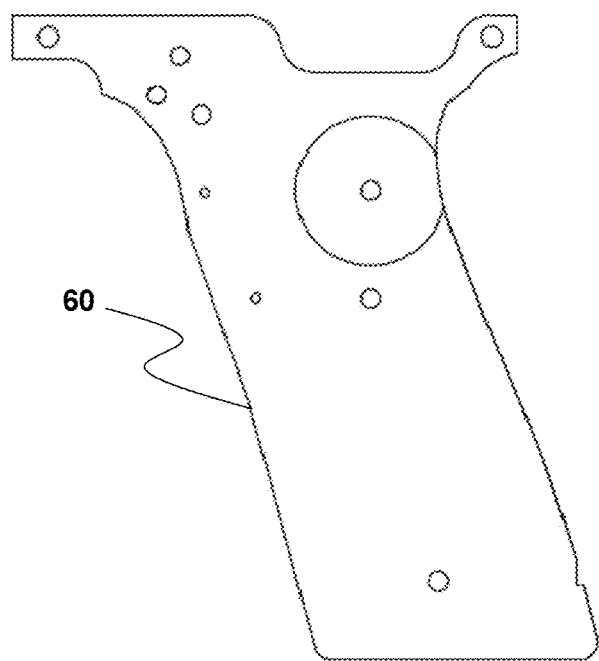
FIG. 9 is a somewhat schematic side view of the right side grip frame of the assembly of FIG. 2.

As shown in FIG. 3, a mounting plate 55 can be configured to provide a support structure for converting a conventional electro-pneumatic paintball gun into a mechanically-actuated pneumatic paintball gun. The mounting plate 55 could, for instance, provide mounting structures for attaching a trigger assembly 118 and the valve actuator 40, along with a modified grip frame 60, to a body of a conventional electro-pneumatic paintball gun. FIGS. 5-9 provide additional illustrations of cams 130, 134, 136, a trigger 120, and a grip frame 60, that could be used in the previous embodiment.

As can be seen from the foregoing description and accompanying drawings, a design incorporating principles of the present inventive concepts can be configured to allow greater control of the dwell time produced by a mechanical pneumatic marker. Specifically, the cam-shaped actuator 132 can be used to provide contact with the valve actuator 140 during a sufficient duration of time to provide the specific dwell time needed to cycle the bolt of a spool valve pneumatic gun design and dump the contents of a compressed gas storage chamber to fire the paintball gun. This design therefore differs from conventional mechanical markers which provide control only over the force used to knock open a firing valve or "poppet valve" to perform the firing operation of the pneumatic gun. Using the traditional poppet valve design, it is difficult, if not impossible, to provide sufficient dwell time to cycle a bolt of a spool valve system, because spool-valve designs require more time (i.e., longer dwell/valve actuation times) to allow the bolt to fully dump the contents of the compressed gas storage chamber.

In one alternative embodiment, oppositely polarized magnets (not shown) could be placed on the surface 132 of the cam 131 and the valve actuator 140. In this embodiment, the repelling forces between the magnet(s) on the cam 131 and the magnet(s) on the valve actuator 140 could be used to actuate the valve actuator 140 as the cam 131 makes its rotation. This design could therefore eliminate surface to surface contact between the cam 131 and valve actuator 140 to thereby eliminate the friction and wear that would otherwise occur between these two parts.

In another alternative embodiment, the trigger 120 could be configured to actuate a pneumatic piston (not shown) that in turn actuates the valve actuator 140. In this embodiment, the pneumatic piston (not shown) can either contact the valve actuator 140 directly or can use oppositely polarized magnets (not shown) to create the force to open the valve actuator 140. The trigger mechanism 118 could, for instance, be configured to actuate a pilot valve (not shown) that controls the operation of the pneumatic piston (not shown), or it could be configured to drive the pneumatic piston directly. This embodiment could thereby eliminate the need for the cam assembly 130 and its associated gearing mechanisms.

Figure 10:
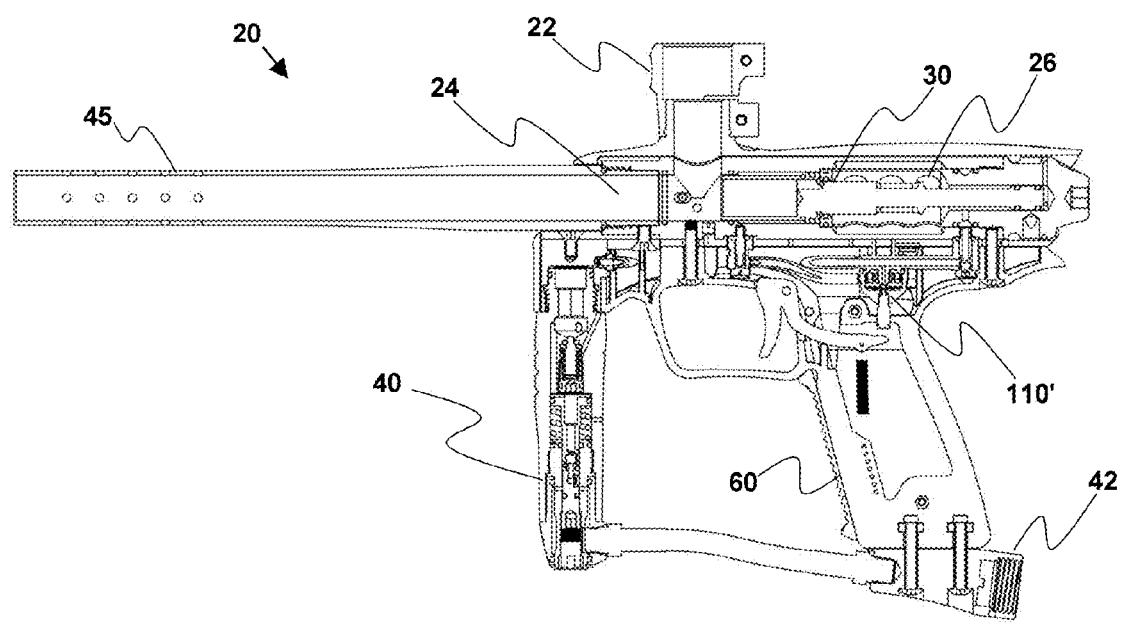
FIG. 10 is a somewhat schematic cross-sectional side view of a pneumatic gun having a trigger assembly and mechanically-actuated pneumatic valve, according to another embodiment incorporating features of the present inventive concepts.
Figure 11:
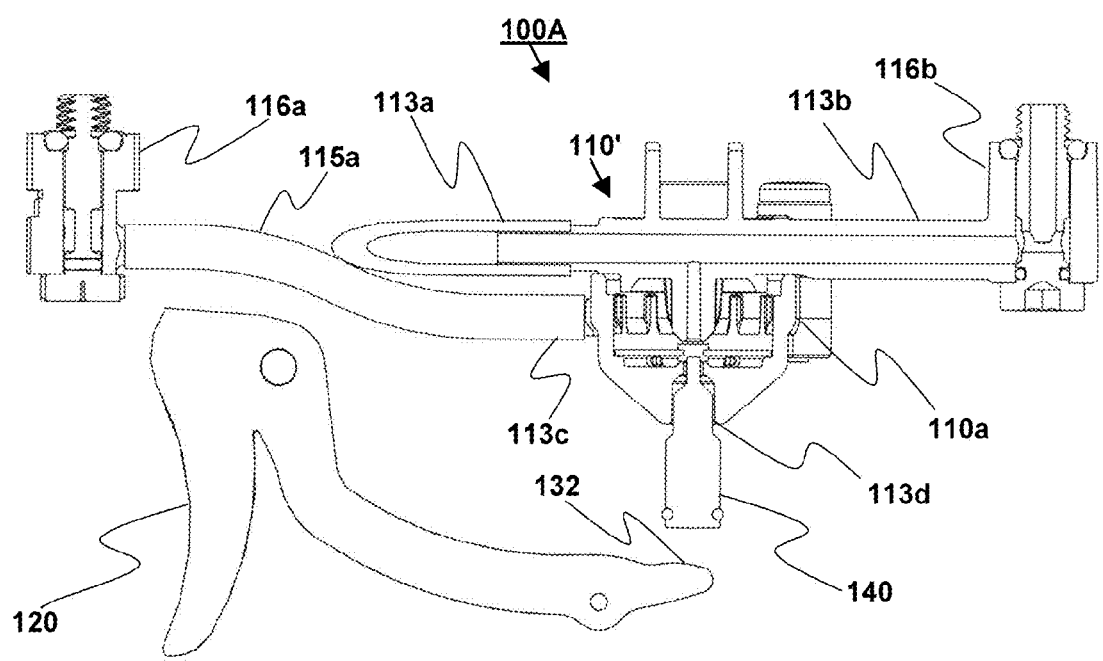
FIG. 11 is a somewhat schematic cross-sectional exploded view showing the trigger and valve assembly removed from the pneumatic gun of FIG. 10, along with its pneumatic connectors.
Figure 12:
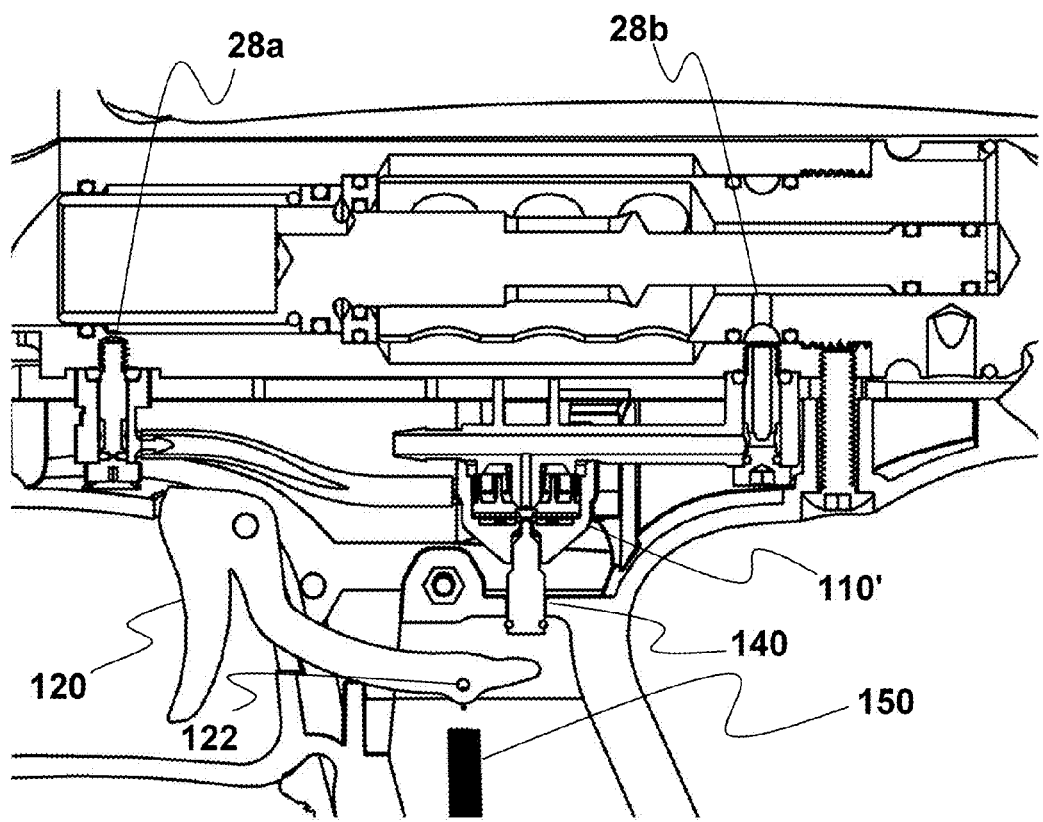
FIG. 12 is a somewhat schematic cross-sectional close-up side view of the mechanically-actuated pneumatic valve and trigger assembly arranged in the pneumatic gun of FIG. 10, illustrating the mechanical pneumatic valve in a deactuated position.
Figure 13:
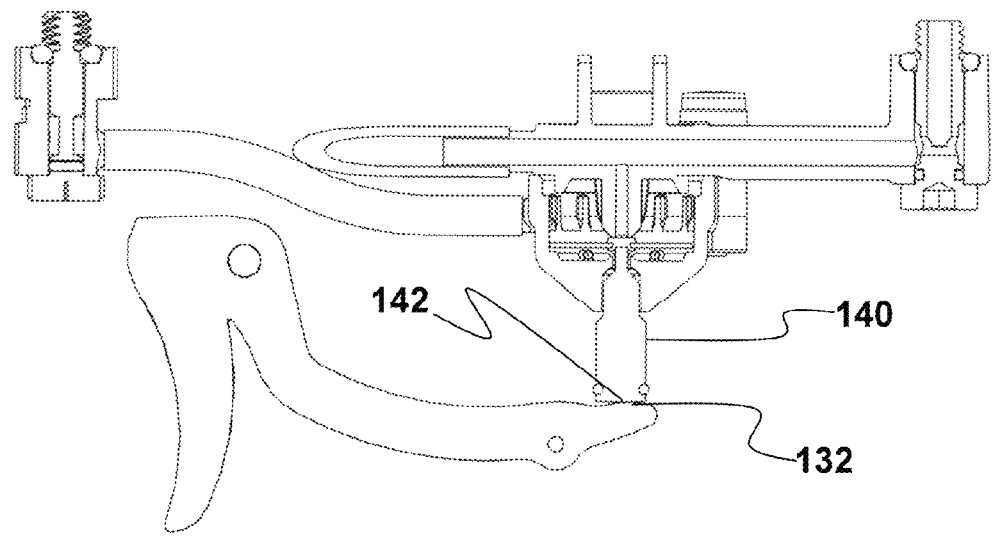
FIG. 13 is a somewhat schematic cross-sectional close-up side view of the mechanically-actuated pneumatic valve and trigger assembly of the pneumatic gun of FIG. 10, illustrating the mechanical pneumatic valve in an actuated position.
Figure 14:
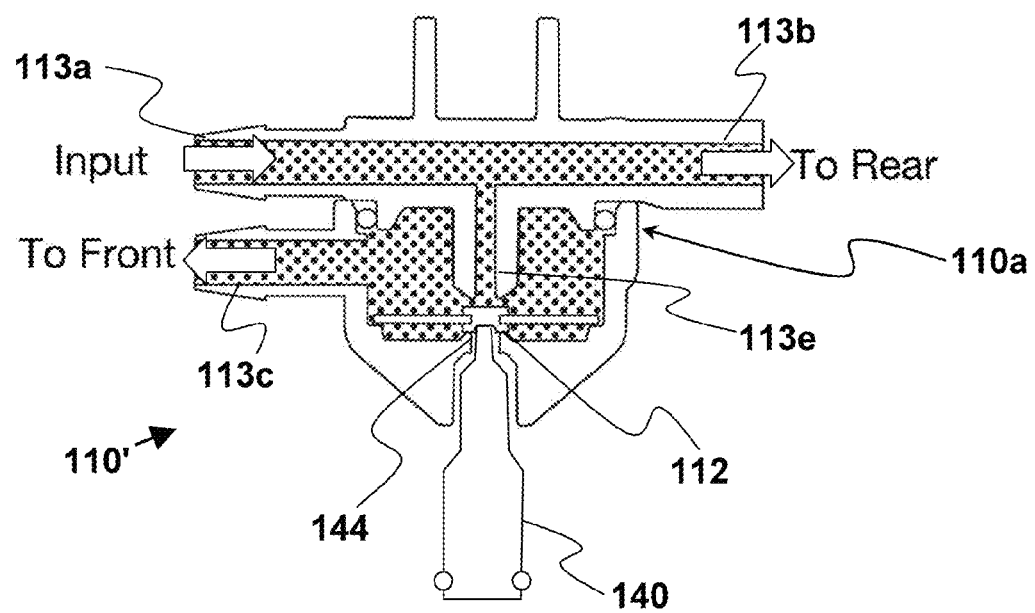
FIG. 14 is a somewhat schematic cross-sectional side view of the mechanically-actuated pneumatic valve of FIG. 12, illustrating a flow path of compressed gas through the pneumatic valve in its deactuated (closed) position.
Figure 15:
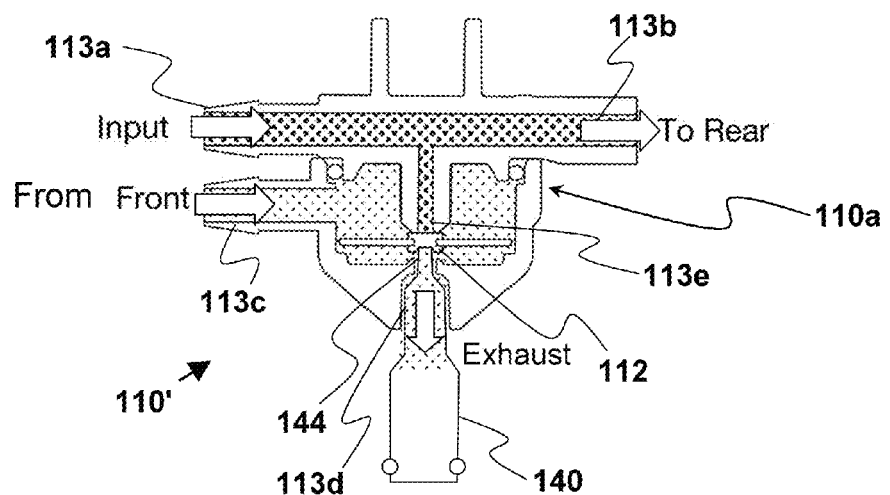
FIG. 15 is a somewhat schematic cross-sectional side view of the mechanically-actuated pneumatic valve of FIG. 12, illustrating a flow path of compressed gas through the pneumatic valve in its actuated (open) position.

FIGS. 10-19 are various schematic illustrations of a pneumatic gun 20 and its components constructed according to another embodiment incorporating principles of the present inventive concepts. FIG. 10 is a somewhat schematic cross-sectional side view of a pneumatic gun 20 having a mechanically-actuated pneumatic valve 110', according to another embodiment incorporating features of the present inventive concepts. FIG. 11 is a somewhat schematic cross-sectional exploded view showing the trigger and valve assembly 100A removed from the pneumatic gun of FIG. 10, along with its pneumatic connectors 16a, 16b. FIG. 11B is a somewhat schematic cross-sectional exploded view showing a trigger and valve assembly 100B having a pneumatic valve 110" constructed according to another embodiment of the inventive concepts. FIG. 12 is a somewhat schematic cross-sectional close-up side view of the mechanically-actuated pneumatic valve and trigger assembly 100A arranged in the pneumatic gun 20 of FIG. 10, illustrating the mechanical pneumatic valve 110' in a deactuated position. FIG. 13 is a somewhat schematic cross-sectional close-up side view of the mechanically-actuated pneumatic valve and trigger assembly 100A of the pneumatic gun 20 of FIG. 10, illustrating the mechanical pneumatic valve 110' in an actuated position. FIG. 14 is a somewhat schematic cross-sectional side view of the mechanically-actuated pneumatic valve 110' of FIG. 12, illustrating a flow path of compressed gas through the pneumatic valve 110' in its deactuated (closed) position. FIG. 15 is a somewhat schematic cross-sectional side view of the mechanically-actuated pneumatic valve 110' of FIG. 12, illustrating a flow path of compressed gas through the pneumatic valve 110' in its actuated (open) position.

Referring first to FIGS. 10-15, a mechanically-actuated pneumatic paintball gun 20 according to embodiments of the present inventive concepts, preferably includes a mechanically-actuated pneumatic valve 110' or 110" having a face seal design. The mechanically-actuated pneumatic valve 110' or 110" can comprise an input port 113a receiving compressed gas from a compressed gas regulator and one or more output ports 113b, 113c. In operation, compressed gas can be constantly supplied from the input port 113a to a first output port 113b.

Figure 11A:
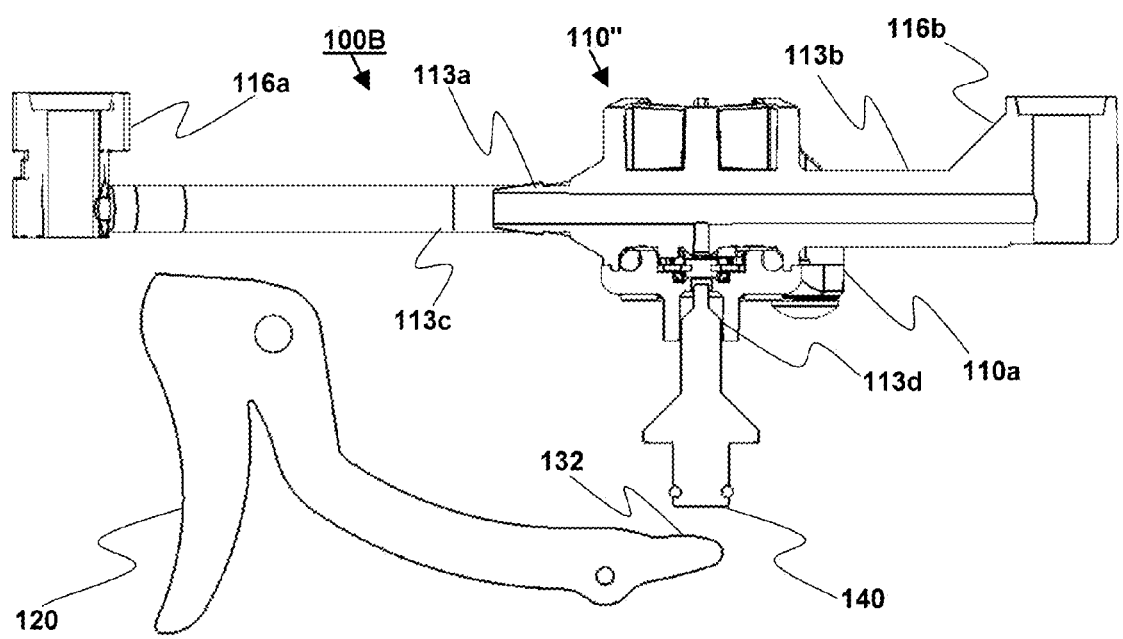
FIG. 11A is a somewhat schematic cross-sectional exploded view showing a trigger and valve assembly according to another embodiment of the present inventive concepts.

The valve body 110a can be formed, for instance, in two sections, including a top section 111a and a bottom section 111b. In one embodiment 100A, illustrated in FIGS. 11, 18 and 18A, the valve assembly 110' includes a valve body 110a in which the top section 111a can include the input port 113a and one of the output ports 113b. The bottom valve section 111b can include a second output port 113c. In another embodiment 100B, illustrated in FIGS. 11A, 18B and 18C, however, the top section 111a of the valve assembly 110" can include the input port 113a and multiple output ports 113b, 113c. Other configurations and arrangements of the valve ports within the sections of the valve body are also possible.

A face seal 112 can be arranged in the valve body 110a and be configured to move between two positions. In a first position, the face seal 112 can permit compressed gas from the input port 113a to be supplied to a second output port 113c through an internal supply port 113e. In a second position, the face seal 112 can block an internal supply port 113e and vent compressed gas from the second output port 113c through an exhaust port 113d in the valve body 110a.

An actuator 140, such as a pin or pin-shaped actuator, for instance, can be configured and arranged to move the face seal 112 from the first position to the second position, for instance, during a trigger pull. A contact surface 132 of the trigger 120 can be configured to contact the valve actuator 140 and move it from the first position to the second position. When the trigger 120 is released, a spring 150 (or other return mechanism, such as opposite polarity magnets, etc.) can cause the trigger to return to its resting position, awaiting another trigger pull. In the case of a spring 150, one end of the spring 150 can be connected to a connecting point 122 of the trigger 120 and another end can be connected to the grip frame 60.

The pneumatic connectors 116a, 116b can be connected to appropriate respective ports 28a, 28b in the pneumatic gun 20. A first pneumatic connector 116a can be connected to a first port 28a to communicate compressed gas between the second output port 113c of the valve 110' or 110" and the first port 28a, which communicates with a forward end of a pneumatic mechanism 30 arranged in the paintball gun 20. A second pneumatic connector 116b can be connected to a second port 28b to communicate compressed gas from the first output port 113b to a rearward end of the pneumatic mechanism 30.

Referring now specifically to FIGS. 14 and 15, when the mechanical, pneumatic valve 110' (or 110") is deactuated (i.e., in its normal, resting state), the valve 110' is closed, permitting compressed gas coming into the valve 110' through the input port 113a from the regulator to be supplied through the internal supply port 113e to the second output port 113c. Compressed gas from the regulator is also constantly supplied to the first output port 113b. When the mechanical, pneumatic valve 110' (or 110") is actuated (i.e., by upward movement of the valve actuator 140), the face seal 112 is seated up against the internal supply port 113e sidewalls to prevent gas from the input port 113a from entering the internal valve chambers and being communicated to the second output port 113c. At the same time, the exhaust port 113d is opened by movement of the face seal 112 away from the outlet sidewalls and compressed gas communicating with the second output port 131c is vented from the valve 110' through the output port 113d. An end 144 of the valve actuator 140 can, for instance, be arranged within a receptacle of the face seal 112, or can be configured to contact the face seal 112 or another component connected to the face seal 112 to move the face seal 112 between its first and second positions.

Referring to FIGS. 14 and 15, in this embodiment, the distance the face seal 112 travels from its first position to its second position can be less than approximately 0.015 inches. A preferred travel distance for the face seal 112 is less than about 0.0075 inches, but can range, for instance, from approximately between 0.005 inches and 0.025 inches. By maintaining a small face seal travel distance, only a short stroke trigger pull is required, and the force required to open the mechanically-actuated pneumatic valve is minimal. This in turn helps minimize the possibility of either misfiring or misfeeding the pneumatic gun. In addition, the use of a face seal valve design can eliminate the need for lubricating the valve's operating mechanism and thereby substantially reduce maintenance issues associated with the pneumatic valve.

Figure 16:
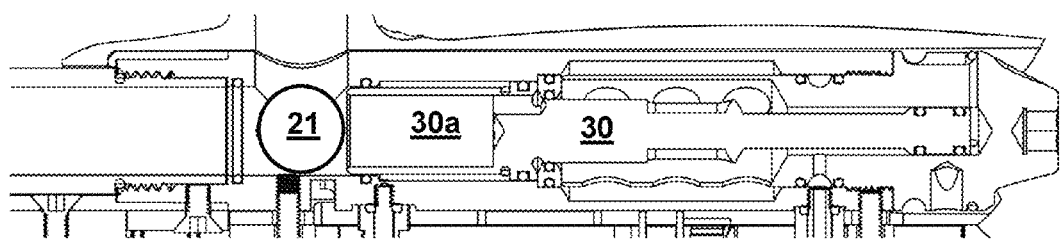
FIG. 16 is a somewhat schematic cross-sectional side view illustrating pneumatic components of a pneumatic gun according to additional principles of the present inventive concepts.
Figure 17A:
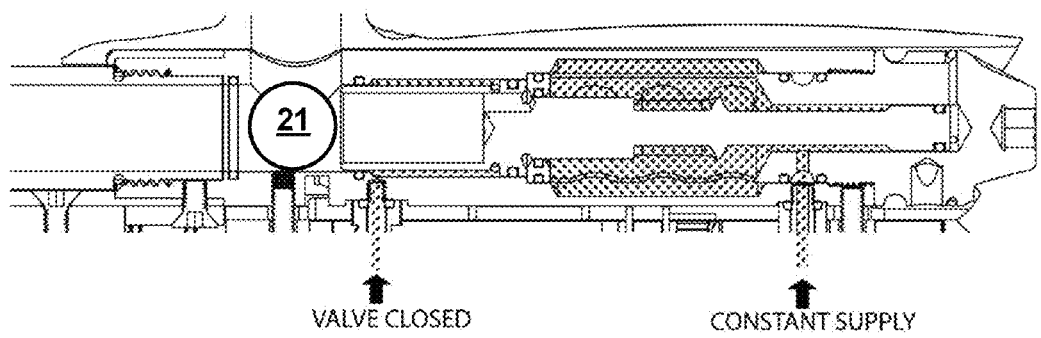
FIGS. 17A-17E are somewhat schematic cross-sectional side views of the pneumatic gun of FIG. 16, illustrating the operation of a pneumatic gun constructed according to additional principles of the present inventive concepts.
Figure 17B:
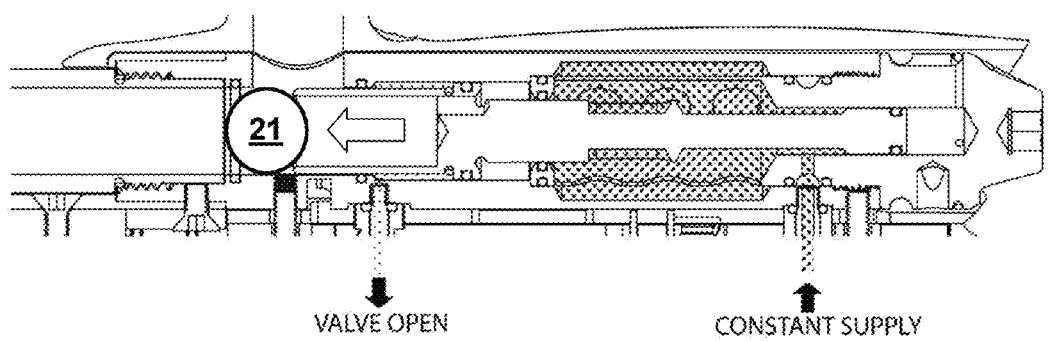
Figure 17C:
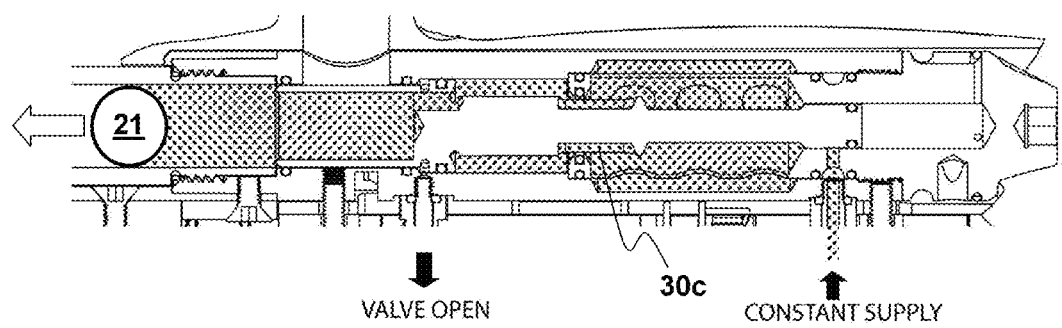
Figure 17D:
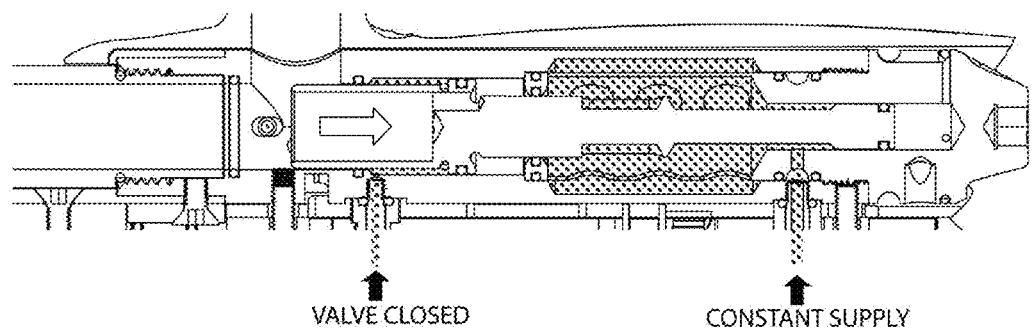
Figure 17E:
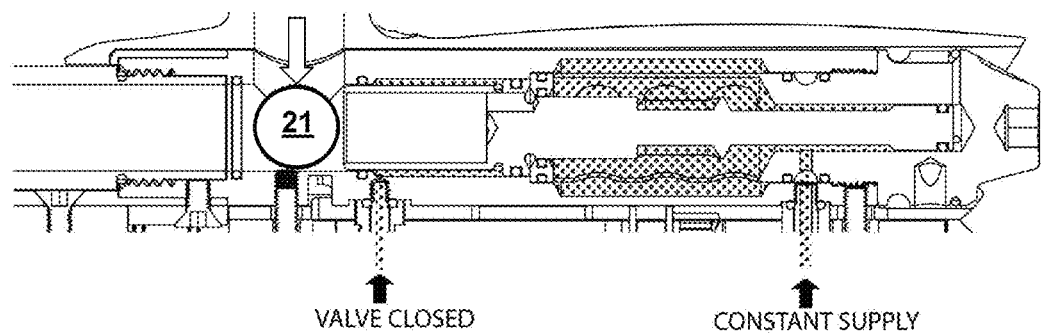

FIGS. 16-17E are somewhat schematic cross-sectional side views illustrating pneumatic components of a pneumatic gun 20 according to additional principles of the present inventive concepts. Referring now to FIGS. 10-17E, in one pneumatic gun embodiment, compressed gas having a selected pressure can be supplied to the gun 20 from a compressed gas regulator 40 that receives compressed gas from a supply connected to the pneumatic gun 20 through a connector 42. In this embodiment, the compressed gas from the regulator 40 is supplied to a mechanical, pneumatic valve 110' or 110", which in turn supplies a constant supply (Constant Supply) of compressed gas to a storage chamber 26 of the pneumatic gun 20 through the rearward port 28b.

As shown in FIG. 17A, the pneumatic valve 110' or 110" can further be configured to supply compressed gas of the selected pressure from the compressed gas regulator to a first (e.g., forward facing) surface of a spool-valve piston 30 through the second output port 113c and the forward gun port 28a when the face seal 112 is arranged in its first, deactuated position. The compressed gas acting on the first surface of the spool-valve piston 30 can overcome a pneumatic or spring force acting on a second (e.g., rearward facing) surface of the spool-valve piston 30. In this state, the pneumatic gun 20 is charged and ready to fire when a projectile 21 is arranged in the loading chamber (breech) at the front of the bolt 30a.

In this embodiment, the spool-valve piston 30 can comprise a bolt 30a and a firing valve 30c. The first surface can be a forward-facing surface and the pneumatic force acting on the first surface can hold the bolt in a rearward position against a pneumatic force from the compressed gas storage chamber acting on the second, rearward-facing piston surface area. The second surface area is therefore preferably smaller than the first surface area.

A trigger 120 can be configured with a contact surface or actuator 132 arranged to contact a valve actuator 140 or valve pin of the pneumatic valve 110' or 110". When the trigger 120 is pulled, its contact surface 132 contacts the valve actuator or pin 140 to move the face seal 112 from its first position to its second position. In the second position, compressed gas is prevented from being supplied to the second output port 113c from the compressed gas regulator 40, and gas from the second output port 113c is instead vented through an exhaust port 113d in the valve body 110a.

When the second output port 113c communicates with the forward piston surface and the valve 1110' or 1110" is opened, gas is vented from an area communicating with the forward piston surface and a force on the second, rearward piston surface drives the bolt 30 forward. The bolt 30 is thereby moved into its forward, firing position (FIG. 17C) and the firing valve 30c opens to permit compressed gas from the compressed gas storage chamber 26 to vent through the firing valve 30c and through ports (not shown) arranged in the bolt 30a to launch a projectile 21 from the gun 20.

Once the trigger 120 is released, pneumatic pressure (or spring or other biasing force) returns the valve seal 112 to its first position (i.e., closed) and compressed gas is again directed to the forward surface area of the pneumatic piston 30. The force on the forward surface area is preferably larger than a force acting on a rearward surface area (i.e., from the constant supply of compressed gas in the compressed gas storage area). The bolt 30a is thereby moved rearward, allowing a paintball or other projectile 21 to drop into the loading area through a loading or feed tube 24, and the firing valve 30c is closed. The gun 20 is then charged and loaded and ready for another firing cycle.

Figure 18:
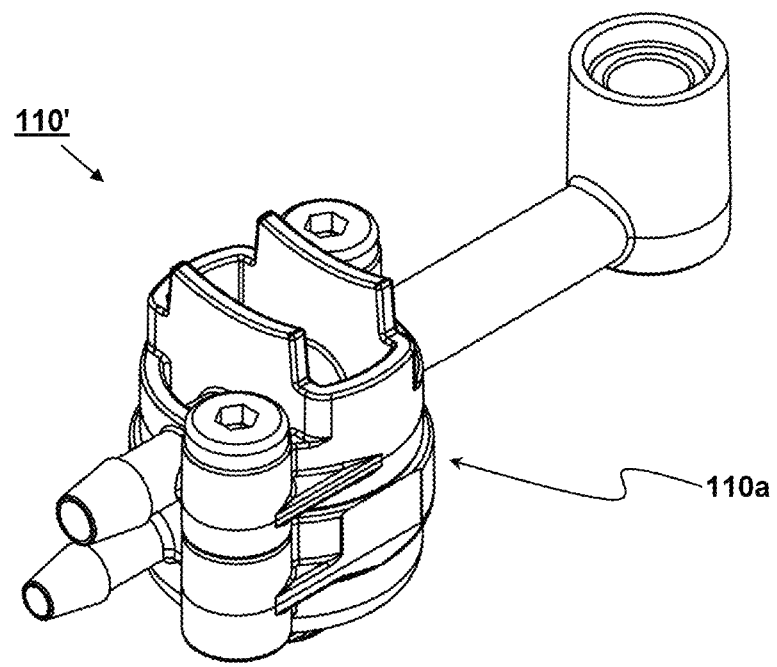
FIGS. 18 and 18A are a somewhat schematic perspective and exploded perspective views, respectively, of a mechanical pneumatic valve for use in the pneumatic gun of FIG. 10, according to another aspect of the present inventive concepts.
Figure 18A:
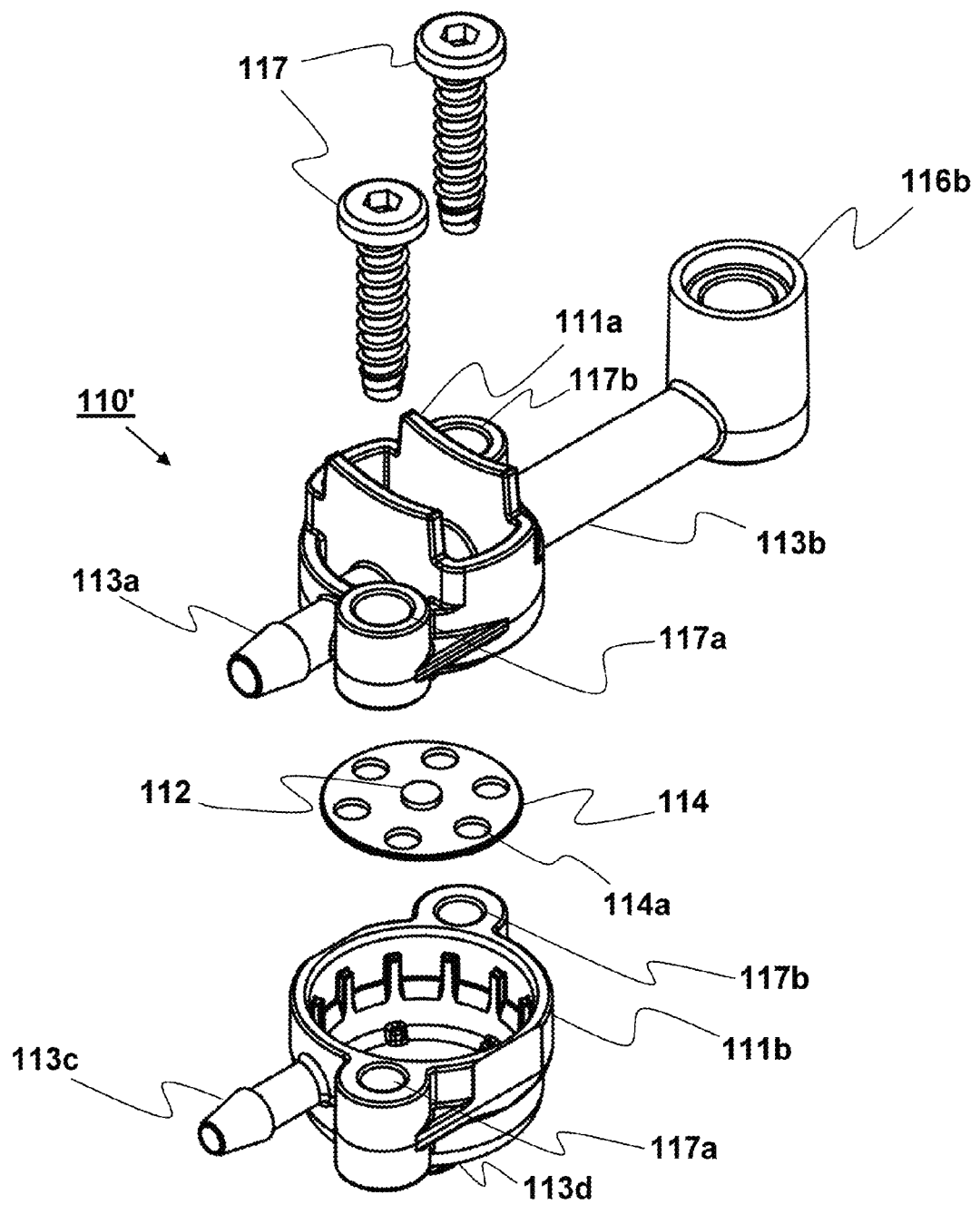

FIGS. 18 and 18A are a somewhat schematic perspective and exploded perspective view of a mechanical pneumatic valve 110' for use in the pneumatic gun 20 of FIG. 10. Referring to FIGS. 18 and 18A, the valve body 110a, can include two sections 1111a and 111b secured together by screws 117 threaded through openings 117a, 117b in the two sections of the valve body 110a. The face seal 112 can be arranged at the center of a disc 114 having ports 114a arranged therethrough to permit compressed gas to flow freely between opposing sides of the disc 114. The disc 114 can help keep the face seal 112 centered in the valve body 110a as it moves up and down.

Figure 18B:
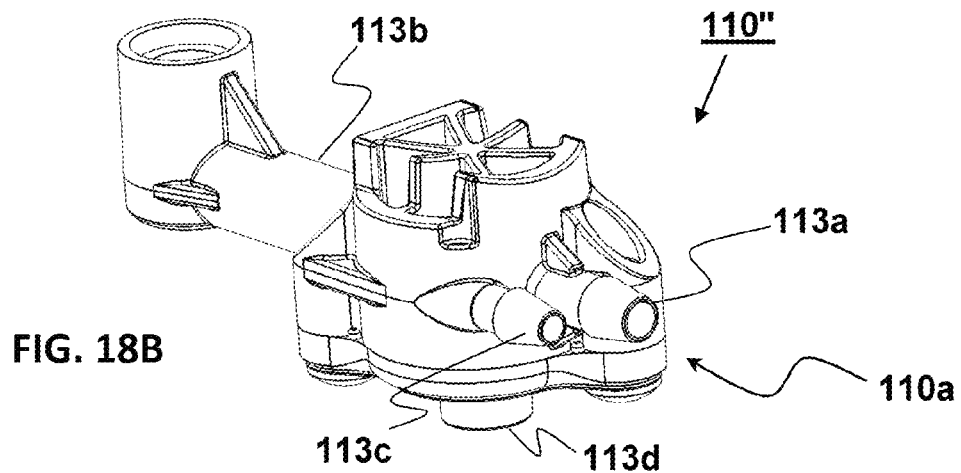
FIGS. 18B and 18C are a somewhat schematic perspective and exploded perspective views, respectively, of a mechanical pneumatic valve for use in a pneumatic gun, according to yet another embodiment of the present inventive concepts.
Figure 18C:
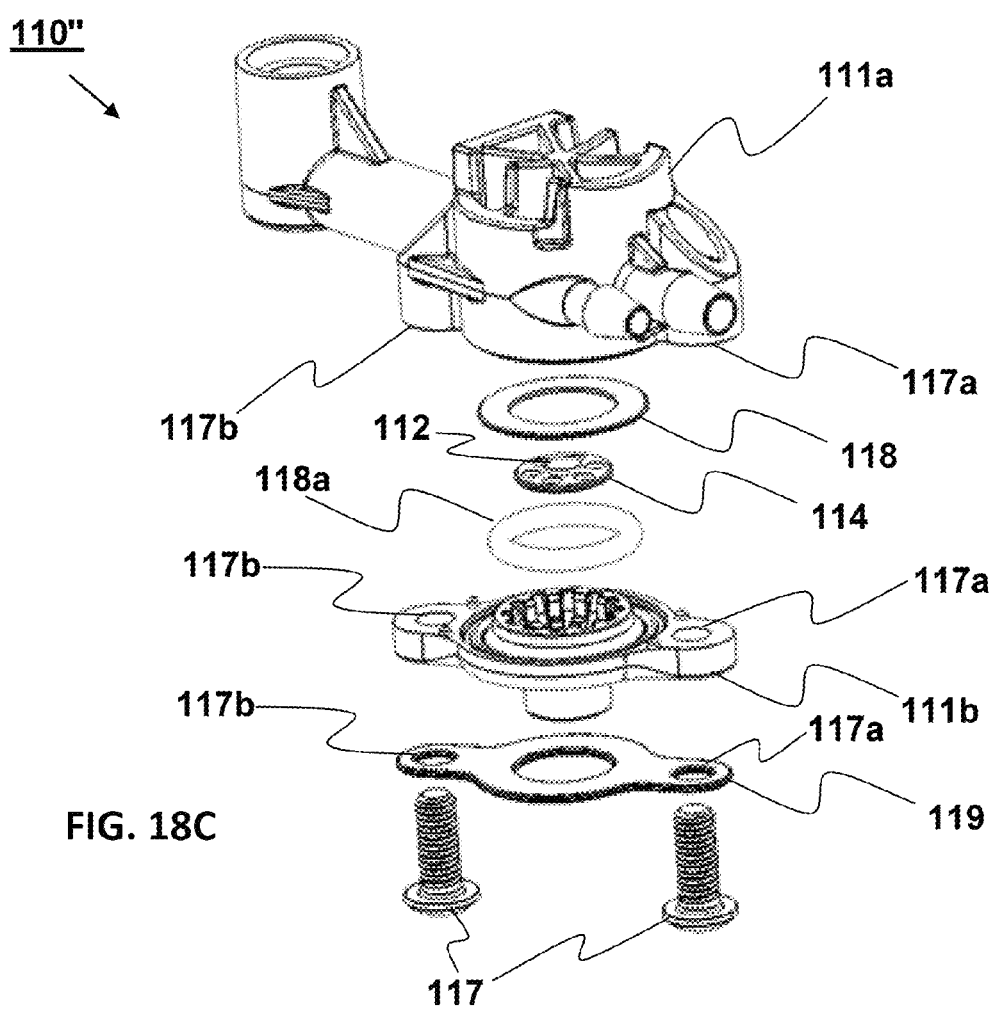

FIGS. 18B and 18C are a somewhat schematic perspective and exploded perspective view of a mechanical pneumatic valve 110" for use in the pneumatic gun 20 of FIG. 10, according to another embodiment of the present inventive concepts. Referring to FIGS. 18B and 18C, the valve body 110a can again include two sections 111a and 111b secured together by screws 117 threaded through openings 117a, 117b in the two sections of the valve body 110a and a clamp plate 119. Unlike the previous embodiment, however, the input port 113a and two exhaust ports 113b and 113c are arranged in the upper valve section 111a. In both embodiments, a third exhaust port 113d can be arranged in the lower valve section 111b.

As further illustrated in FIG. 18C, the valve 110" can include a clamp plate 119, an o-ring 118a, and a backup ring 118. The clamp plate 119 helps secure the valve sections 111a and 111b together. The backup ring 118 and o-ring 118a seal the internal valve chamber housing the disc 114.

Figure 19:
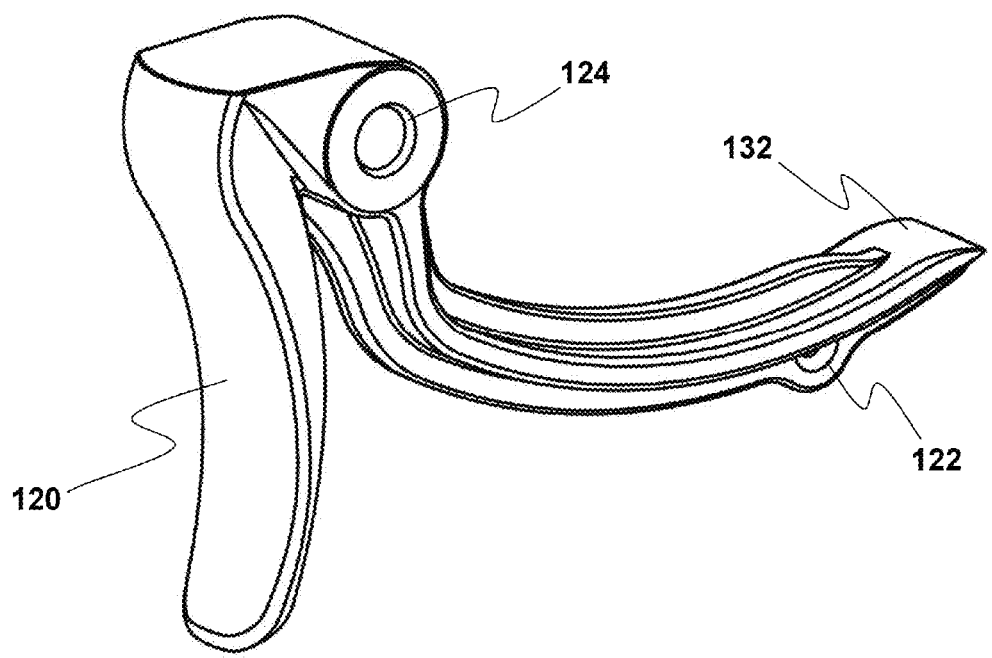
FIG. 19 is a somewhat schematic perspective view of a trigger for use in the pneumatic gun of FIG. 10, according to yet another aspect of the present inventive concepts.

FIG. 19 is a somewhat schematic perspective view of a trigger 120 for use in the pneumatic gun 20 of FIG. 10. Referring to FIGS. 10 and 19, the trigger 120 can be arranged in a grip 60 of a paintball gun 20, such that it can rotate a predetermined distance about an anchor point 124. The rotation angle is preferably sufficient to enable a contact surface 132 of the trigger to contact and move a valve actuator 140 a sufficient distance to open the valve 110' or 110" and activate a firing sequence of the pneumatic gun 20. It should be noted that the terms "open" and "closed" for the pneumatic valve are relative terms and could be used interchangeably to refer to the respective positions of the valve during operation.

Having described and illustrated principles of the present inventive concepts in various preferred embodiments thereof, it should be apparent that the inventive concepts can be modified in arrangement and detail without departing from such principles.

What is claimed is:

1. A mechanical trigger assembly for a pneumatic gun, comprising:
   a trigger frame comprising a trigger connected to the trigger frame;
   an actuator mechanically coupled to or formed integral with the trigger such that activation of the trigger causes movement of the actuator, and wherein movement of the actuator is configured to mechanically actuate a valve actuator of a mechanical pneumatic valve when the trigger assembly is operatively arranged in a pneumatic gun;
   wherein actuation of the valve actuator is configured to move a face seal away from a contact surface of the mechanical pneumatic valve where the face seal abuts against the mechanical pneumatic valve, without the face seal sliding along the contact surface, to actuate the mechanical pneumatic valve and initiate a firing operation of the pneumatic gun.

2. A trigger assembly according to claim 1, wherein the actuator comprises a contact surface of the trigger configured to contact the valve actuator.

3. A trigger assembly according to claim 2, wherein the valve actuator is a pin or pin-shaped actuator arranged to contact the face seal of the pneumatic valve through an opening in a body of the mechanical pneumatic valve.

4. A trigger assembly according to claim 2, wherein the trigger comprises an extension that extends substantially horizontally away from the trigger, and wherein the actuator is arranged on an end of the extension, said trigger being hingedly connected to the trigger frame to permit rotational movement of the trigger with respect to the trigger frame.

5. A trigger assembly according to claim 4, further comprising a biasing mechanism configured to supply a biasing force to bias the trigger in a first position, wherein actuator does not contact the valve actuator in the first position.

6. A trigger assembly according to claim 1, wherein the face seal comprises a circular disk having an outer portion and a central portion, wherein the outer portion aligns the face seal within a body of the mechanical pneumatic valve, and wherein the central portion comprises a sealing member configured to selectively block either an internal supply port or an exhaust port of the mechanical pneumatic valve.

7. A trigger assembly according to claim 1, wherein the valve actuator comprises an actuator head arranged in the trigger frame so as to be contacted by the trigger actuator when the trigger actuator reaches a second position.

8. A trigger assembly according to claim 7, wherein the valve actuator further comprises a pin or pin-shaped actuator having a first end arranged in the actuator head and a second end extending through an opening in a body of the mechanical pneumatic valve, wherein said second end is configured to open the face seal of the mechanical pneumatic valve when the valve actuator is moved to a second position.

9. A trigger assembly according to claim 8, wherein the face seal is permitted to close when the valve actuator is in a first position, and wherein a pneumatic force applied to the face seal provides the only force used to reset the trigger to a first position.

10. A trigger assembly according to claim 1, wherein the face seal of the mechanical pneumatic valve comprises a disk shape having a centrally located sealing member, wherein the sealing member is configured to block an exhaust port of the mechanical pneumatic valve to supply compressed gas to a forward surface area of a pneumatic piston in the pneumatic gun when the mechanical pneumatic valve is in a deactuated state, and wherein the sealing member is configured to move away from the exhaust port to vent compressed gas away from the forward surface area of the pneumatic piston when the mechanical pneumatic valve is in an actuated state.

11. A trigger assembly according to claim 10, wherein said pneumatic gun is configured to receive a supply of compressed gas from a compressed gas source into a compressed gas storage area and wherein the compressed gas in the compressed gas storage area is configured to act on a second surface area of the pneumatic piston, and wherein a force acting on the second surface area of the pneumatic piston is configured to move the piston forward when the compressed gas is vented away from the forward surface area.

12. A trigger assembly according to claim 1, wherein the valve actuator comprises a pin-shaped body having at least three separate diameters, wherein a first diameter is configured to fit through an opening in a body of the mechanical pneumatic valve to permit contact between the valve actuator and the face seal, wherein a second diameter is configured to align the valve actuator within a receptacle in the body of the mechanical pneumatic valve, and wherein a third diameter is larger than a diameter of the receptacle.

13. A trigger assembly for a pneumatic gun having a spool-type pneumatic assembly, said trigger assembly comprising:
    a trigger configured to be actuated by a user of the pneumatic gun through a pulling motion;
    an actuator mechanically connected to or formed integral with the trigger such that the pulling motion of the trigger causes movement of the actuator;
    an actuating surface arranged on the actuator and configured to mechanically actuate a valve actuator of the pneumatic gun when the trigger assembly is operatively arranged in the pneumatic gun, and wherein actuation of the valve actuator of the pneumatic gun initiates a firing operation of the pneumatic gun by mechanically moving a face seal of a pneumatic valve away from a contact surface of the pneumatic valve, without the face seal sliding along the contact surface.

14. A trigger assembly according to claim 13, wherein the valve actuator is a pin-shaped actuator arranged through an opening in a body of the pneumatic valve, and wherein a second end of the pin-shaped actuator comprises a contact surface configured to physically contact the face seal of the pneumatic valve to actuate the pneumatic valve by unseating the face seal from abutting against the contact surface which surrounds an exhaust port of the pneumatic valve.

15. A trigger assembly according to claim 14, wherein the valve actuator further comprises an actuator head arranged in the trigger assembly so as to be contacted by the trigger when the trigger is actuated, said actuator head having a first end of the pin-shaped actuator arranged therein or mechanically coupled thereto.

16. A trigger assembly according to claim 14, wherein actuation of the pneumatic valve moves a centrally located sealing member of the face seal away from the exhaust port to vent compressed gas through the pneumatic valve away from a forward piston surface area of a pneumatic piston in the pneumatic gun to permit forward movement of the pneumatic piston.

17. A trigger assembly according to claim 16, wherein the trigger is configured to travel through a predetermined rotational angle during the trigger pull, and wherein the predetermined rotational angle is sufficient to permit contact between the contact surface of the pin-shaped actuator and the face seal to move the face seal a sufficient distance to effectively perform the firing operation of the pneumatic gun.

18. A mechanically-actuated pneumatic gun comprising:
a trigger hingedly arranged in a trigger frame;
a pneumatic valve comprising a face seal and further comprising a valve actuator configured to physically contact and move the face seal away from but not along an abutting contact surface to actuate the pneumatic valve; and
a trigger actuator arranged in communication with or integral with the trigger and configured to physically move the valve actuator a sufficient distance during the trigger pull to actuate the pneumatic valve and perform a firing operation of the pneumatic gun.

19. A pneumatic gun according to claim 18, said pneumatic gun comprising:
a pneumatic piston having a first surface area and a second surface area;
a compressed gas storage area configured to house a quantity of compressed gas in communication with the second surface area;
wherein during operation of the pneumatic gun, the first surface area receives a supply of compressed gas from the pneumatic valve through an area between an internal supply port and the face seal when the valve is in a deactuated position, and wherein the supply of compressed gas to the first surface area is cut off by abutting the face seal against the contact surface arranged on a sidewall of the internal supply port, and wherein the compressed gas previously supplied to the first surface area is vented through an area between the face seal and an exhaust port in the pneumatic valve when the valve is in an actuated position.

20. A pneumatic gun according to claim 19, wherein venting the compressed gas from the first surface area permits the pneumatic piston to move forward and perform a firing operation of the pneumatic gun.

* * * * *